(12) United States Patent
Yamamoto et al.

(10) Patent No.: US 11,528,689 B2
(45) Date of Patent: Dec. 13, 2022

(54) BASE STATION APPARATUS CAPABLE OF EFFECTIVELY USING UPLINK RESOURCES, METHOD FOR CONTROLLING THE SAME, AND COMPUTER-READABLE STORAGE MEDIUM

(71) Applicant: KDDI CORPORATION, Tokyo (JP)

(72) Inventors: Toshiaki Yamamoto, Tokyo (JP); Shigeo Terabe, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 94 days.

(21) Appl. No.: 17/082,745

(22) Filed: Oct. 28, 2020

(65) Prior Publication Data

US 2021/0045108 A1 Feb. 11, 2021

Related U.S. Application Data

(63) Continuation of application No. PCT/JP2019/007749, filed on Feb. 28, 2019.

(30) Foreign Application Priority Data

May 25, 2018 (JP) ............................. JP2018-100625

(51) Int. Cl.
*H04W 72/04* (2009.01)

(52) U.S. Cl.
CPC ... *H04W 72/0413* (2013.01); *H04W 72/0453* (2013.01)

(58) Field of Classification Search
CPC ......... H04W 72/0413; H04W 72/0453; H04W 72/0446; H04W 28/06; H04W 72/04; H04W 72/10; H04L 5/0094; H04L 5/0053; H04L 1/1854
See application file for complete search history.

(56) References Cited

U.S. PATENT DOCUMENTS

| | | | | |
|---|---|---|---|---|
| 11,088,783 | B2 * | 8/2021 | Lin | .................... H04L 1/0067 |
| 11,153,856 | B2 * | 10/2021 | Tang | .................... H04L 27/2626 |
| 11,197,274 | B2 * | 12/2021 | Lin | .................... H04W 72/1268 |
| 2013/0250828 | A1 | 9/2013 | Chou | |
| 2017/0013608 | A1 | 1/2017 | Du | |

(Continued)

FOREIGN PATENT DOCUMENTS

| | | |
|---|---|---|
| JP | 2015-520533 A | 7/2015 |
| JP | 2017-504248 A | 2/2017 |

(Continued)

OTHER PUBLICATIONS

Office Action issued in corresponding Japanese Patent Application No. 2018-100625 dated Mar. 1, 2021, with partial English translation.

(Continued)

*Primary Examiner* — Brian T O Connor
(74) *Attorney, Agent, or Firm* — Foley & Lardner LLP (57) ABSTRACT

A base station apparatus, which allocates uplink radio resources to a terminal apparatus, checks whether or not first frequency resources reserved for transmission of control information in the radio resources are used, and allocates at least a part of the first frequency resources to transmission of user data if it is checked that the at least a part of the first frequency resources are not used.

9 Claims, 4 Drawing Sheets

(56) References Cited

U.S. PATENT DOCUMENTS

2017/0188352 A1    6/2017  Lee
2019/0261397 A1    8/2019  Takeda et al.

FOREIGN PATENT DOCUMENTS

JP      2017-528038 A       9/2017
WO   WO-2018/084137 A1   5/2018

OTHER PUBLICATIONS

LG Electronics Inc., "Efficient Utilization of Unused PUCCH RB [online]", 3GPP TSG-RAN WG1#52bis R1-081258, Mar. 31, 2008, sections 1, 2, Internet <URL: http://www.3gpp.org/ftp/tsg_ran/WG1_RL1/TSGR1_52b/Docs/R1-081258.zip>.

* cited by examiner

BASE STATION APPARATUS CAPABLE OF EFFECTIVELY USING UPLINK RESOURCES, METHOD FOR CONTROLLING THE SAME, AND COMPUTER-READABLE STORAGE MEDIUM

CROSS-REFERENCE TO RELATED APPLICATION(S)

This application is a continuation of International Patent Application No. PCT/JP2019/007749 filed on Feb. 28, 2019, which claims priority to and the benefit of Japanese Patent Application No. 2018-100625 filed May 25, 2018, the entire disclosures of which are incorporated herein by reference.

TECHNICAL FIELD

The present invention relates to a base station apparatus, a method for controlling the same, and a computer-readable storage medium, and relates more specifically to a technique that enables effective use of uplink resources.

BACKGROUND ART

In a cellular communication system such as a Long Term Evolution (LTE) system, various control signals are transmitted in order to control communication between base station apparatus and terminal apparatuses. For example, a check response signal, which indicates whether or not data transmitted through a downlink from the base station apparatus to a terminal apparatus has been normally received, is transmitted as an uplink control signal from the terminal apparatus to the base station apparatuses. Also, the terminal apparatuses may transmit a CQI (Channel Quality Indicator) report indicating a channel state in a downlink, as an uplink control signal to the base station apparatus at a fixed period. Such an uplink control signal is called a Physical Uplink Control Channel (PUCCH), and a predetermined amount of frequency resources in an uplink frequency band is reserved to transmit the PUCCH. Meanwhile, thus securing frequency resources for the control signal in advance may cause inconvenience. Patent Document 1 describes that it is conceivable that the frequency resources for the control signal may become insufficient due to a large number of terminal apparatuses transmitting the control signal. Patent Document 1 then describes that, to address this problem, resources for a control channel for some terminal apparatuses are taken up, and the resources that are thus taken up are allocated to other terminal apparatuses.

CITATION LIST

Patent Literature

PTL 1: Japanese Patent Laid-Open No. 2017-504248

SUMMARY OF INVENTION

Technical Problem

Meanwhile, it is also conceivable that frequency resources for the control signal are not effectively used. For example, when the number of connected terminal apparatuses is small, the frequency resources for the control signal are reserved but not used, and radio resources cannot be effectively used in the system as a whole.

Solution to Problem

The present invention provides a technique for effectively using uplink radio resources.

A base station apparatus according to an aspect of the present invention is a base station apparatus that allocates uplink radio resources to a terminal apparatus, and includes: a checking unit configured to check whether or not first frequency resources reserved for transmission of control information in the radio resources are used; and an allocation unit configured to allocate at least a part of the first frequency resources to transmission of user data if it is checked by the checking unit that the at least a part of the first frequency resources are not used.

Advantageous Effects of Invention

According to the present invention, uplink resources can be effectively used.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the invention and, together with the description, serve to explain principles of the invention.

DESCRIPTION OF EMBODIMENTS

Hereinafter, embodiments of the present invention will be described with reference to the drawings.

Configuration of Radio Communication System

Figure 1:
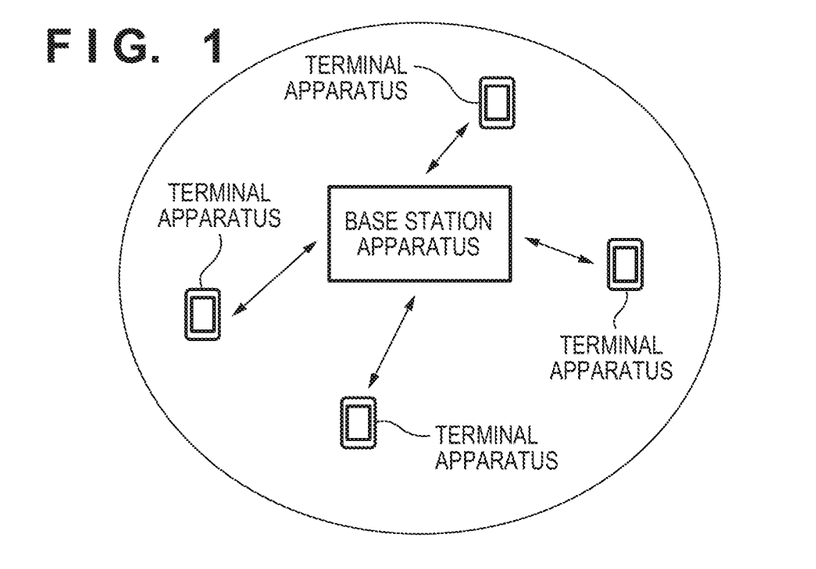
FIG. 1 is a diagram showing an example configuration of a radio communication system.

FIG. 1 shows an example configuration of a radio communication system according to the present embodiment. This radio communication system is, for example, a cellular communication system that includes a base station apparatus and terminal apparatuses, and enables downlink communication from the base station apparatus to the terminal apparatuses and uplink communication from the terminal apparatuses to the base station apparatus. In an example, this system is a Long Term Evolution (LTE) system, but the following technique can also be applied to other systems in which a band for a control signal is reserved, such as cellular communication systems of generations after LTE.

Figure 2A:
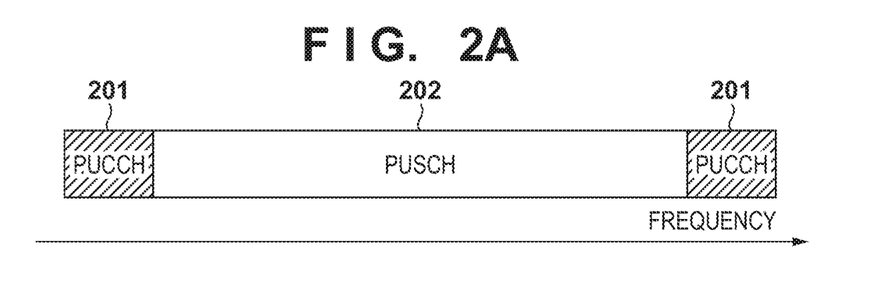
FIG. 2A is a diagram showing a configuration of an uplink signal.

In the LTE system, radio resources (time resources and frequency resources) are allocated to each of the terminal apparatuses, and control information and user data are transmitted and received using these radio resources between the terminal apparatus and the base station apparatus. Here, in an uplink through which a signal is transmitted from a terminal apparatus to the base station apparatus, a first domain 201 in the frequency resources is reserved for the PUCCH used to transmit control formation, as shown in FIG. 2A. In a second domain 202, which is a domain excluding the first domain, a PUSCH (Physical Uplink Shared Channel), which is used to transmit user data (or control information depending on the case), is transmitted.

The present embodiment is designed to effectively use the first domain 201 in which the PUCCH is transmitted. That is to say, the base station apparatus determines whether or not there is a possibility that the PUCCH is to be used, and determines whether or not the frequency resource reserved for the PUCCH can be used to transmit user data. That is to say, it is determined whether or not the radio resources reserved for the PUCCH is reliably not used. If it is determined that the frequency resources reserved for the PUCCH can be used to transmit user data, the base station apparatus allocates these frequency resources to transmission of the user data by the terminal apparatus. Thus, it is possible to reduce the probability that the frequency resources reserved for the PUCCH is not used, and to improve the frequency use efficiency in uplinks in the system as a whole. In addition, peak throughput in uplink communication in the terminal apparatuses can be improved in accordance with an increase in the amount of radio resources that can be allocated to the terminal apparatuses. The base station apparatus can change the amount of radio resources reserved for the PUCCH, and may notify the terminal apparatuses of information indicating this amount. However, according to the present embodiment, radio resources can be effectively used without making such a change. Although it is not easy to make a change in the amount of radio resources reserved for the PUCCH in real time, according to the technique described in the present embodiment, radio resources can be effectively used in real time even in a state where such a change in the amount of radio resources cannot be made.

Figure 2B:
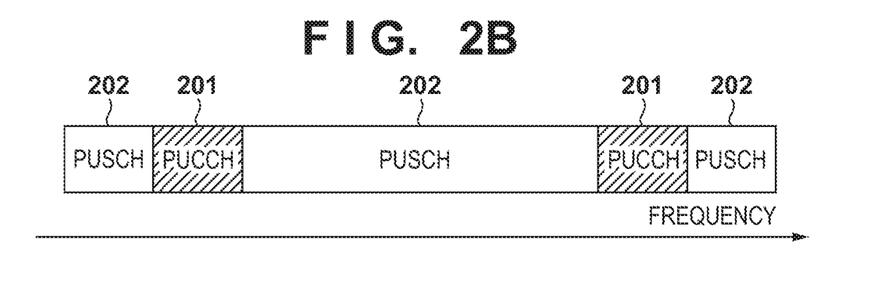
FIG. 2B is a diagram showing a configuration of an uplink signal.

In an LTE system, SC-FDMA (Single Carrier-Frequency Division Multiple Access) is used as an uplink communication method. In the SC-FDMA, continuous frequency resources are allocated to one terminal apparatus, and two or more discrete frequency bands are not used at the same time by one terminal apparatus. At this time, radio resources reserved for the PUCCH are commonly disposed at end portions of the frequency band in which uplink signals are transmitted, as in FIG. 2A, but are also allowed to be disposed at portions other than the end portions, as in FIG. 2B. Also, radio resources for user data transmission are allocated to the terminal apparatuses while avoiding radio resources reserved for the PUCCH (i.e. within a range of radio resources that can be used for the PUSCH). For this reason, in the case where a disposal pattern such as shown in FIG. 2B is used, the frequency bandwidth that can be allocated to one terminal apparatus may be smaller than that in the case of FIG. 2A. In contrast, the terminal apparatus can use the entire band at a time by performing allocation so as to use the frequency resource reserved for the PUCCH to transmit user data as mentioned above. Accordingly, peak throughput in uplink communication of this terminal apparatus can be significantly improved.

The base station apparatus determines whether or not the radio resources reserved for the PUCCH is used to transmit the PUCCH, based on, for example, whether or not the current time is a timing of receiving ACK (acknowledgement)/NACK (negative acknowledgement) in response to data transmitted in a downlink. That is to say, in an LTE system, for example, it is defined that a response signal (ACK or NACK) is to be transmitted four subframes after downlink data is transmitted. Thus, the base station apparatus can determine whether or not a response signal is scheduled to be transmitted, in accordance with the timing at which downlink data was transmitted. Also, the position of frequency resources at which a response signal is transmitted is determined in accordance with a resource block in which data was transmitted in a downlink, and the base station apparatus can specify this position. For this reason, the base station apparatus may allocate, to user data transmission, resources that are known to be not used to transmit a response signal, of the radio resources reserved for the PUCCH. Also, in LTE, it is defined that a terminal apparatus to which the PUSCH is allocated and that transmits user data transmits a response signal through the allocated PUSCH. In this regard too, since the PUSCH is allocated by the base station apparatus, the base station apparatus can determine whether the terminal apparatus transmits a response signal through the PUCCH, or transmits a response signal through the PUSCH. Accordingly, the base station apparatus may determine that a terminal apparatus that transmits a response signal through the PUSCH will not transmit a response signal through the PUCCH, and determine that radio resources for the PUCCH can be allocated to the PUSCH.

The base station apparatus may also determine whether or not the radio resources reserved for the PUCCH are used to transmit the PUCCH, based on whether or not a terminal apparatus exists to which a CQI (Channel Quality Indicator) report is to be transmitted. The CQI report is transmitted periodically or non-periodically, and a periodically-transmitted CQI is transmitted through the PUCCH. Since the base station apparatus recognize a CQI transmission period, the base station apparatus can determine whether or not the PUCCH is used, based on whether or not the current time is a timing at which the CQI is transmitted. Note that the CQI report is also transmitted through the PUSCH from a terminal apparatus to which the PUSCH is allocated. Thus, the base station apparatus can determine whether or not the terminal apparatus transmits the CQI reports through the PUCCH, or transmits the CQI report through the PUSCH. Accordingly, the base station apparatus may determine that a terminal apparatus that transmits the CQI report through the PUSCH will not transmit the CQI report through the PUCCH, and determine that the radio resources for the PUCCH can be allocated to the PUSCH.

The terminal apparatuses can also transmit, at a fixed period, an uplink scheduling request (SR) for making a request for PUSCH allocation, using the radio resources reserved for the PUCCH. Although the base station apparatus designates, in advance, a timing at which the SR can be transmitted for each terminal apparatus, whether or not the SR is transmitted is determined in accordance with whether or not the terminal apparatus makes a request for PUSCH allocation, and therefore, the base station apparatus cannot determine whether the SR is actually transmitted at the designated timing. However, the base station apparatus can determine that the PUCCH will not be used for the SR at least at a timing that is not the timing at which the SR is transmitted. Accordingly, the base station apparatus may determine that the radio resources for the PUCCH can be allocated to the PUSCH at a timing at which the SR is not transmitted.

The base station apparatus can determine whether the radio resources for the PUCCH is not used, based on a combination of the above-described determinations. Then, if it is checked that the PUCCH resources are not used, the base station apparatus can allocate these resources to the PUSCH.

Note that if only one terminal apparatus is currently connected to the base station apparatus, when the PUSCH is allocated to this terminal apparatus, the terminal apparatus will transmit control information through the allocated PUSCH, rather than the PUCCH, when needing to transmit the control information. Accordingly, when only one terminal apparatus is currently connected, the base station apparatus may determine that the radio resources for the PUCCH will not be used, regardless of the timing or the like, and allocate these resources to the PUSCH.

In an uplink, random access may be made for the terminal apparatuses to perform origination, handover, or the like. For this reason, in an LTE system, radio resources for random access are reserved. Accordingly, the base station apparatus may be configured to not allocate, to the PUSCH, the radio resources reserved for random access.

As described above, if it is determined that radio resources reserved for transmission of a predetermined control signal or the like are not used, the base station apparatus may allocate these radio resources to user data transmission. Thus, it is possible to improve frequency use efficiency in the entire system and throughput in individual communication performed by the terminal apparatuses.

In the following, an example of a configuration of this base station apparatus and a flow of processing to be performed will be described.

Configuration of Base Station Apparatus

Figure 3:
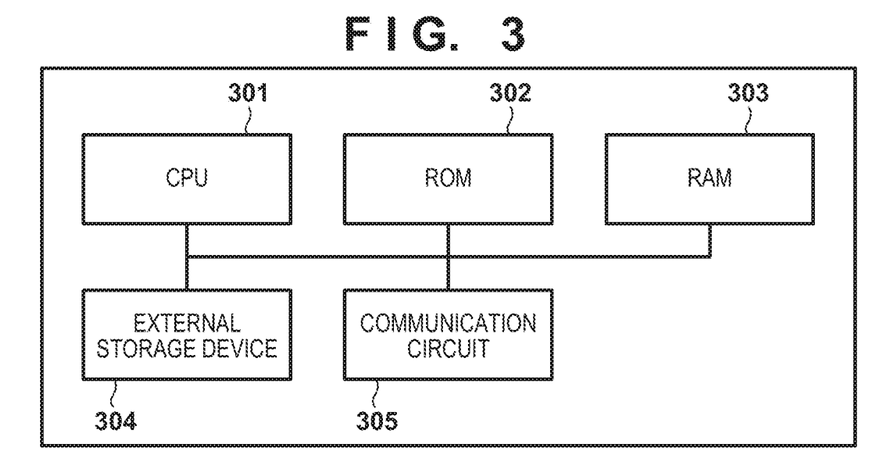
FIG. 3 is a diagram showing an example hardware configuration of a base station apparatus.

FIG. 3 shows an example hardware configuration of the base station apparatus according to the present embodiment. In one example, the base station apparatus has a CPU 301, a ROM 302, a RAM 303, an external storage device 304, and a communication circuit 305. In the base station apparatus, a program that is recorded in, for example, any of the ROM 302, the RAM 303, and the external storage device 304 and realizes each function of the above-described base station apparatus is executed by the CPU 301.

For example, the base station apparatus controls the communication circuit 305 using the CPU 301, and communicates with other devices. Note that, for example, the communication circuit 305 of the base station apparatus can communicate with other base station apparatuses and other network nodes through a wired circuit, and can also wirelessly communicate with one or more (a plurality of) terminal apparatuses conforming to the LTE standard. Although FIG. 3 shows a schematic diagram of the configuration of the base station apparatus that has one communication circuit 305, the base station apparatus may have a plurality of communication circuits. For example, the base station apparatus may have a first communication circuit for wired communication, and a second communication circuit for LTE wireless communication.

Note that the base station apparatus may include dedicated hardware for executing each function, or may execute some functions using hardware and execute the other portions using a computer that causes the program to work. All of the functions may be executed by a computer and a program.

Figure 4:
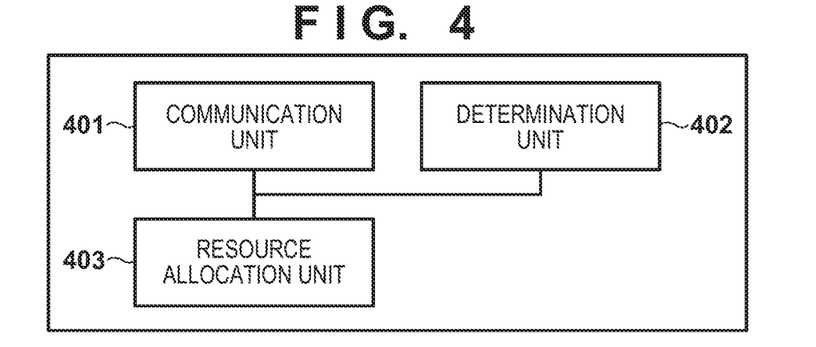
FIG. 4 is a diagram showing an example functional configuration of the base station apparatus.

FIG. 4 shows an example functional configuration of the base station apparatus according to the present embodiment. The base station apparatus has a communication unit 401, a determination unit 402, and a resource allocation unit 403. The communication unit 401 is a functional unit that wirelessly communicates at least with the terminal apparatuses. The communication unit 401 transmits, to the terminal apparatuses, a radio signal that includes at least either control information or user data in downlinks, and receives, from the terminal apparatuses, a radio signal that includes at least either control information and user data in uplinks. The determination unit 402 determines whether or not frequency resources reserved for a control signal (PUCCH) can be used to transmit user data. The determination unit 402 checks that the frequency resources reserved for the PUCCH are not used, as described above. If the determination unit 402 determines that the frequency resources reserved for the control signal can be used to transmit user data, the resource allocation unit 403 allocates, to the terminal apparatuses, frequency resources for user data transmission, of the frequency resources for the control signal and frequency resources for user data transmission. Note that if a sufficient amount of frequency resources can be allocated without using the frequency resources reserved for the control signal, the resource allocation unit 403 may be configured to not allocate these frequency resources for the control signal.

Processing Procedure

Figure 5:
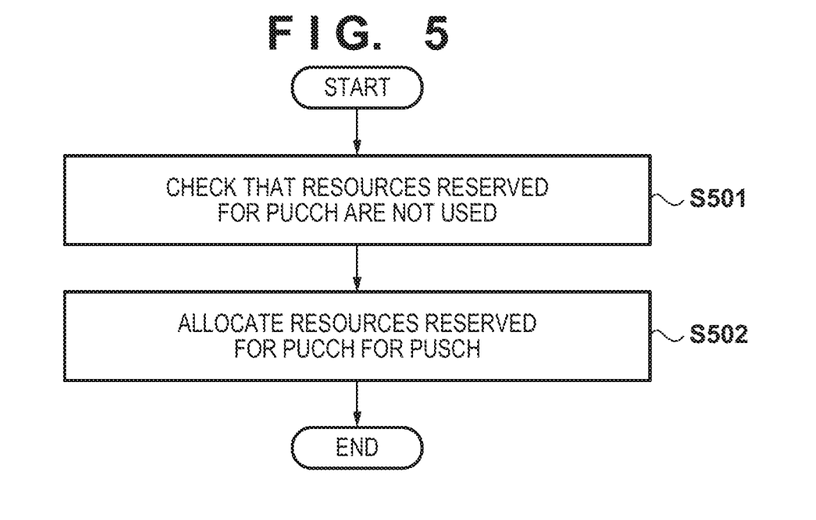
FIG. 5 is a diagram showing an example of a flow of processing performed by the base station apparatus.

FIG. 5 shows an example of a flow of processing performed by the base station apparatus according to the present embodiment. Note that the processing in FIG. 5 is processing for allocating uplink frequency resources for each subframe, and other processing performed by common base station apparatuses is also naturally performed.

Initially, the base station apparatus checks, for one subframe, that frequency resources reserved for the PUCCH are not used (S501). As mentioned above, this is to check that a response signal or a CQI is not planned to be transmitted, or that the current time is not a timing at which the SR is transmitted. The base station apparatus then allocates the frequency resources for the PUCCH confirmed not to be used, to the PUSCH for a terminal apparatus such that the terminal apparatus can transmit user data therethrough (S502).

Here, allocation of frequency resources will be described with reference to FIGS. 6 and 7.

Figure 6:
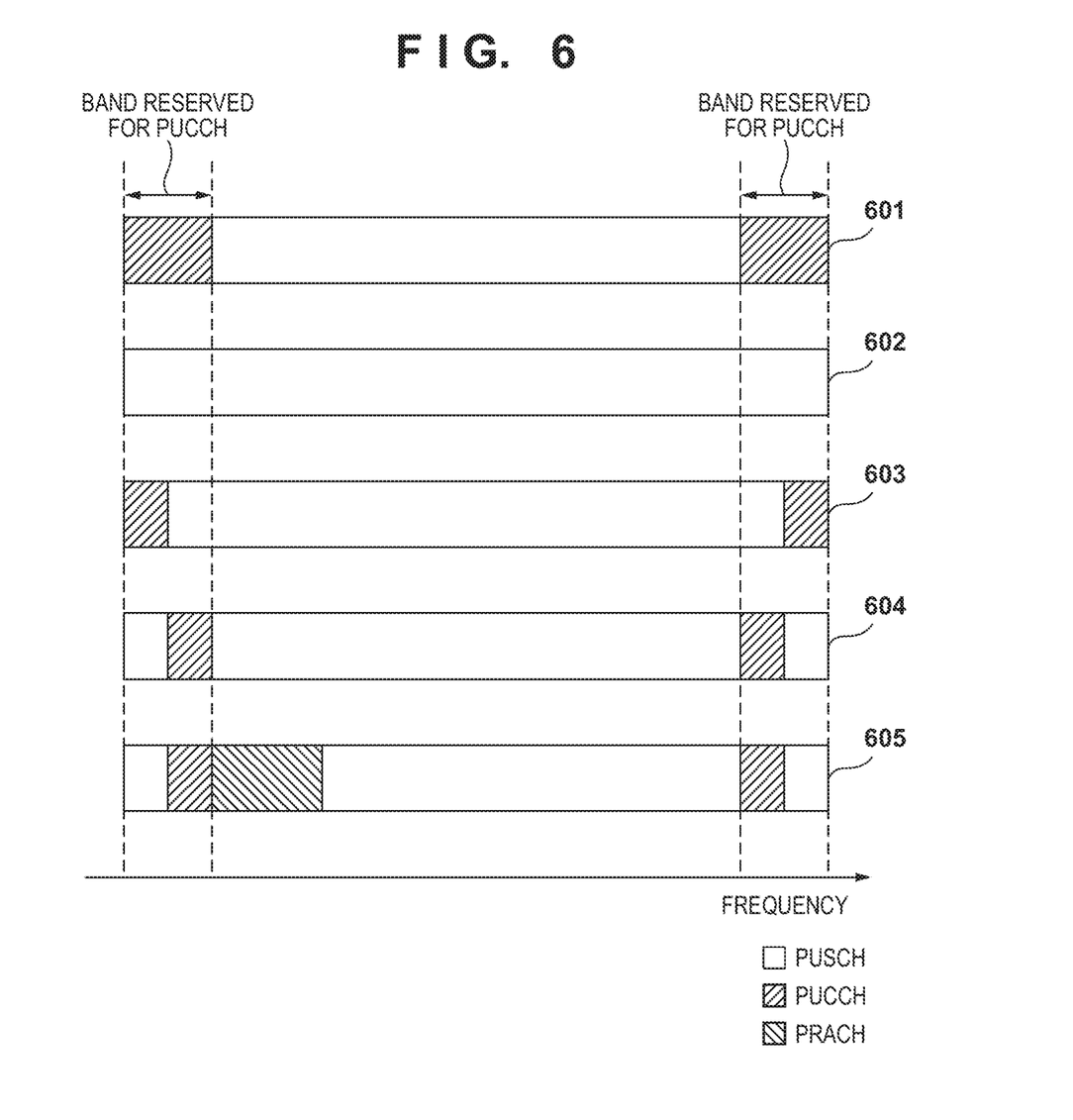
FIG. 6 is a diagram showing example allocation of frequency resources.

FIG. 6 shows an example of the case where frequency resources reserved for the PUCCH are disposed at end portions of an entire uplink frequency band. In the example in FIG. 6, ordinarily, the frequency resources (frequency bands) reserved for the PUCCH are not allocated for the PUSCH even if the PUCCH is not transmitted, as denoted by 601. In contrast, in the present embodiment, if it is checked that radio resources reserved for the PUCCH are not used, the frequency resources for the PUCCH can be allocated to the PUSCH, as denoted by 602. Note that, in a situation where a part of the radio resources for the PUCCH are not used as denoted by 603, the unused frequency resources may also be allocated to the PUSCH. Thus, frequency use efficiency in the entire system is improved, and peak throughput in uplink communication of a terminal apparatus can also be improved by allocating an extended frequency band to one terminal apparatus, for example. Meanwhile, discontinuous frequency bands may be allocated to the PUSCH depending on the positions of frequency resources at which there is a possibility that a response signal or a CQI is transmitted, or the SR is transmitted, as denoted by 604. In such a case, since the frequency bands that can be used by one terminal apparatus that uses SC-FDMA needs to be continuous, there is a possibility that peak throughput in uplink communication of one terminal apparatus cannot be improved. Even in this case however, frequency use efficiency in the system as a whole can be improved by allocating radio resources that are reserved for the PUCCH but are not used, to a terminal apparatus with a small volume of data to be transmitted, for example. Note that, at a timing at which there is a frequency band reserved for a PRACH (Physical Random Access Channel) as denoted by 605, this frequency band is not allocated to the PUSCH.

Figure 7:
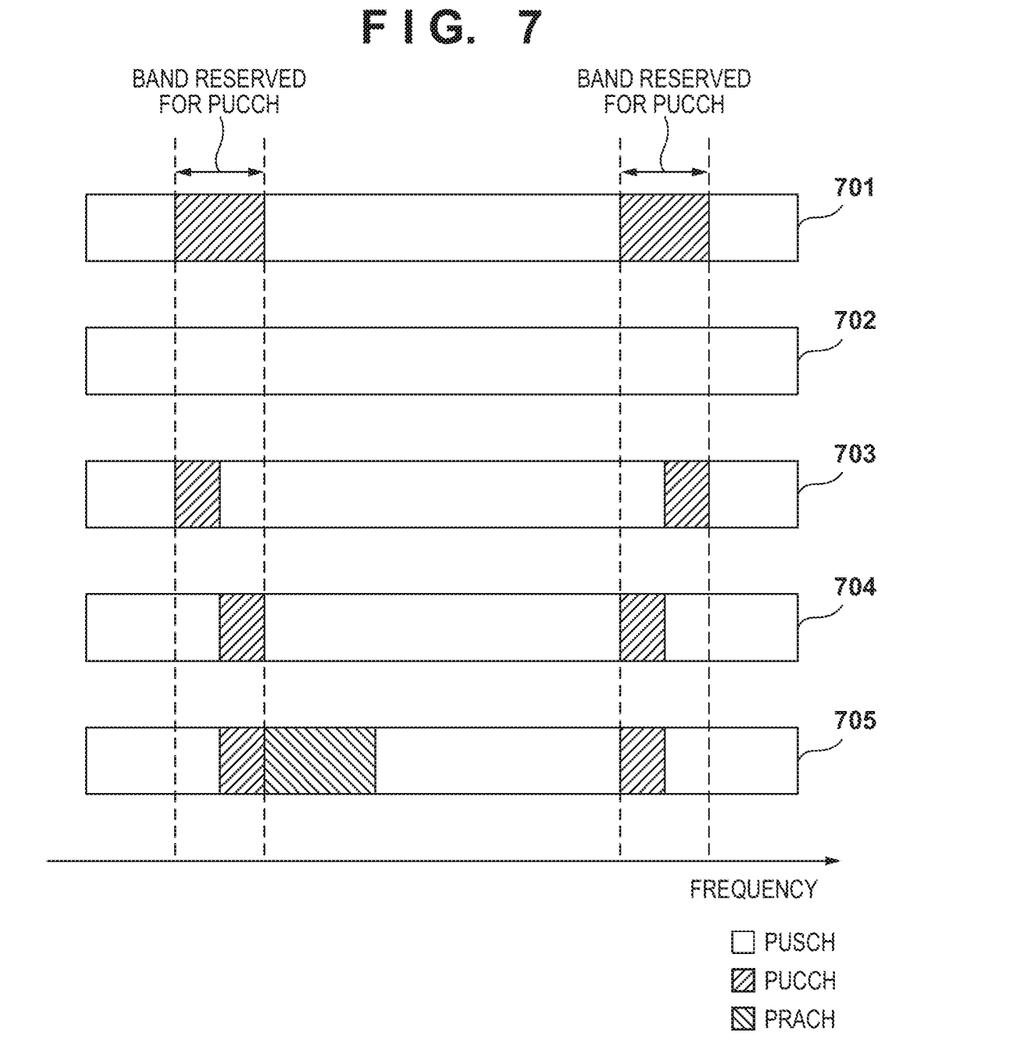
FIG. 7 is a diagram showing example allocation of frequency resources.

FIG. 7 shows an example of the case where frequency resources reserved for the PUCCH are disposed inward of the end portions of an entire uplink frequency band. In the example in FIG. 7, ordinarily, the frequency resources (frequency bands) reserved for the PUCCH are not allocated for the PUSCH even if the PUCCH is not transmitted, as denoted by 701. For this reason, the continuous frequency bandwidth that can be allocated to one terminal apparatus is suppressed smaller than in the case in FIG. 6. In contrast, in the present embodiment, if it is checked that radio resources reserved for the PUCCH are not used, the radio resources for the PUCCH can be allocated to the PUSCH, as denoted by 702. As a result, all uplink frequency bands for the system uplink can be allocated to one terminal apparatus, and peak throughput in uplink communication of the terminal apparatus can be remarkably improved. The states denoted by 703 to 705 are similar to the states denoted by 603 to 605 in FIG. 6, respectively.

As described above, in the present embodiment, in a radio communication system such as an LTE system in which radio resources are reserved for transmission of control information, these radio resources are allocated to user data transmission if it is checked that the radio resources are not used. Thus, it is possible to increase radio resources that can be used to transmit user data, and also reduce the amount of radio resources that are reserved for control information but are not used. Accordingly, throughput and frequency use efficiency can be improved.

Although a representative configuration and processing flow according to the present embodiment have been described above, these are merely an example, and various modifications and changes of the embodiment described in the present specification within the scope described in the claims are also naturally included in the scope of right of the present invention.

The present invention is not limited to the above embodiment, and various changes and modifications can be made within the spirit and scope of the present invention. Therefore, to apprise the public of the scope of the present invention, the following claims are made.

The invention claimed is:

1. A base station apparatus that allocates uplink radio resources to a terminal apparatus, comprising:
a checking unit configured to check whether or not first frequency resources reserved for transmission of control information in the radio resources are used; and
an allocation unit configured to allocate at least a part of the first frequency resources to transmission of user data if it is checked by the checking unit that the at least a part of the first frequency resources are not used,
wherein
the first frequency resources are disposed adjacent to second frequency resources and third frequency resources that are reserved for the transmission of the user data, and between the second frequency resources and the third frequency resources, in a frequency domain, and
the allocation unit allocates, to the transmission of the user data, radio resources that include the at least a part of the first frequency resources from frequency resources that includes the first frequency resources, the second frequency resources, and the third frequency resources, and that are continuous in the frequency domain.

2. The base station apparatus according to claim 1, wherein
the checking unit checks that the first frequency resources are not used, based at least on a response signal for downlink data transmitted from the base station apparatus being not transmitted using the first frequency resources.

3. The base station apparatus according to claim 1, wherein
the checking unit checks that the first frequency resources are not used, based at least on a signal indicating a state of a downlink channel being not transmitted using the first frequency resources.

4. The base station apparatus according to claim 1, wherein
the checking unit checks that the first frequency resources are used at a timing at which a signal for making a request for allocation of uplink radio resources for the transmission of the user data is transmitted.

5. The base station apparatus according to claim 1, wherein
the checking unit checks that the first frequency resources are not used, if only one terminal apparatus is connected to the base station apparatus.

6. The base station apparatus according to claim 1, wherein
if it is checked by the checking unit that only some of the first frequency resources are used, the allocation unit allocates at least a part of frequency resources including frequency resources in the first frequency resources excluding the some of the frequency resources, to the transmission of the user data.

7. The base station apparatus according to claim 1, wherein
the allocation unit allocates, to the transmission of the user data, radio resources including the at least a part of the first frequency resources from a frequency band that includes frequency resources including frequency resources that do not overlap the first frequency resources and that are reserved for the transmission of the user data as frequency resources that do not overlap the first frequency resources.

8. A method for controlling a base station apparatus that allocates uplink radio resources to a terminal apparatus, the method comprising:
a checking step of checking whether or not first frequency resources reserved for transmission of control information in the radio resources are used, by checking unit; and
an allocation step of, if it is checked in the checking step that at least a part of the first frequency resources are not used, allocating the at least a part of the first frequency resources to transmission of user data,
wherein
the first frequency resources are disposed adjacent to second frequency resources and third frequency resources that are reserved for the transmission of the user data, and between the second frequency resources and the third frequency resources, in a frequency domain, and the allocation unit allocates, to the transmission of the user data, radio resources that include the at least a part of the first frequency resources from frequency resources that includes the first frequency resources, the second frequency resources, and the third frequency resources, and that are continuous in the frequency domain.

9. A non-transitory computer-readable storage medium that stores a program for causing a computer included in a base station apparatus that allocates uplink radio resources to a terminal apparatus, to:

check whether or not first frequency resources reserved for transmission of control information in the radio resources are used; and if it is checked that at least a part of the first frequency resources are not used, allocate the at least a part of the first frequency resources to transmission of user data, wherein the first frequency resources are disposed adjacent to second frequency resources and third frequency resources that are reserved for the transmission of the user data, and between the second frequency resources and the third frequency resources, in a frequency domain, and the allocation unit allocates, to the transmission of the user data, radio resources that include the at least a part of the first frequency resources from frequency resources that includes the first frequency resources, the second frequency resources, and the third frequency resources, and that are continuous in the frequency domain.

* * * * *